Feb. 20, 1968     N. J. NORMANDO     3,370,151
CONTROL SYSTEM USING RADIANT-ENERGY DETECTOR SCANNING
Filed May 13, 1964     5 Sheets-Sheet 1

INVENTOR
NEIL J. NORMANDO
BY
AGENT

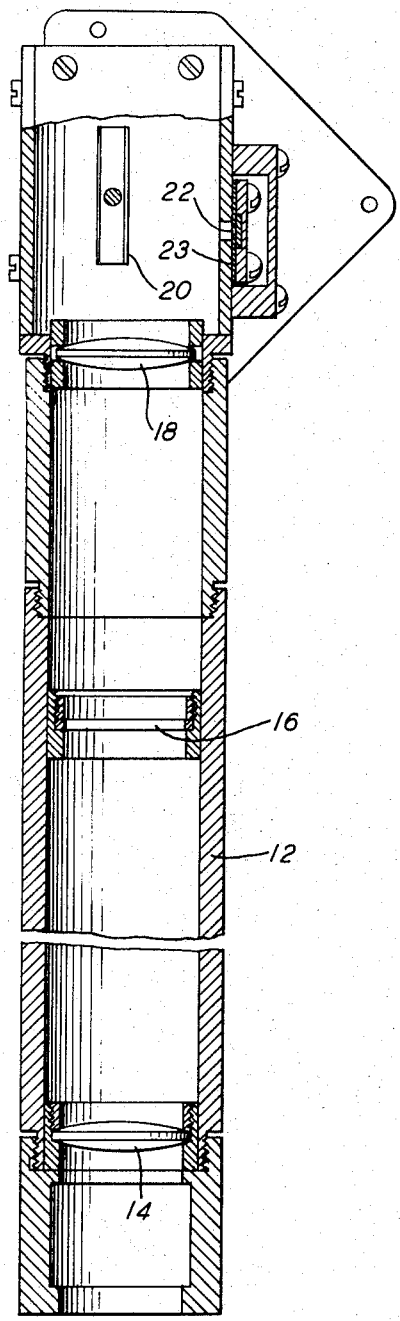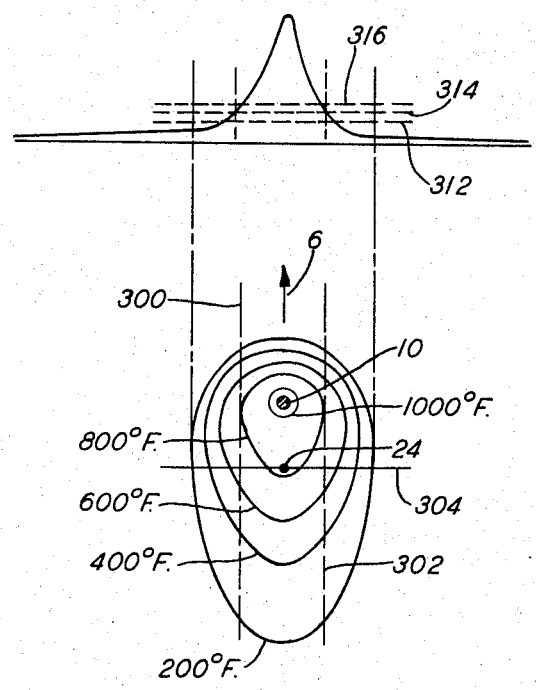

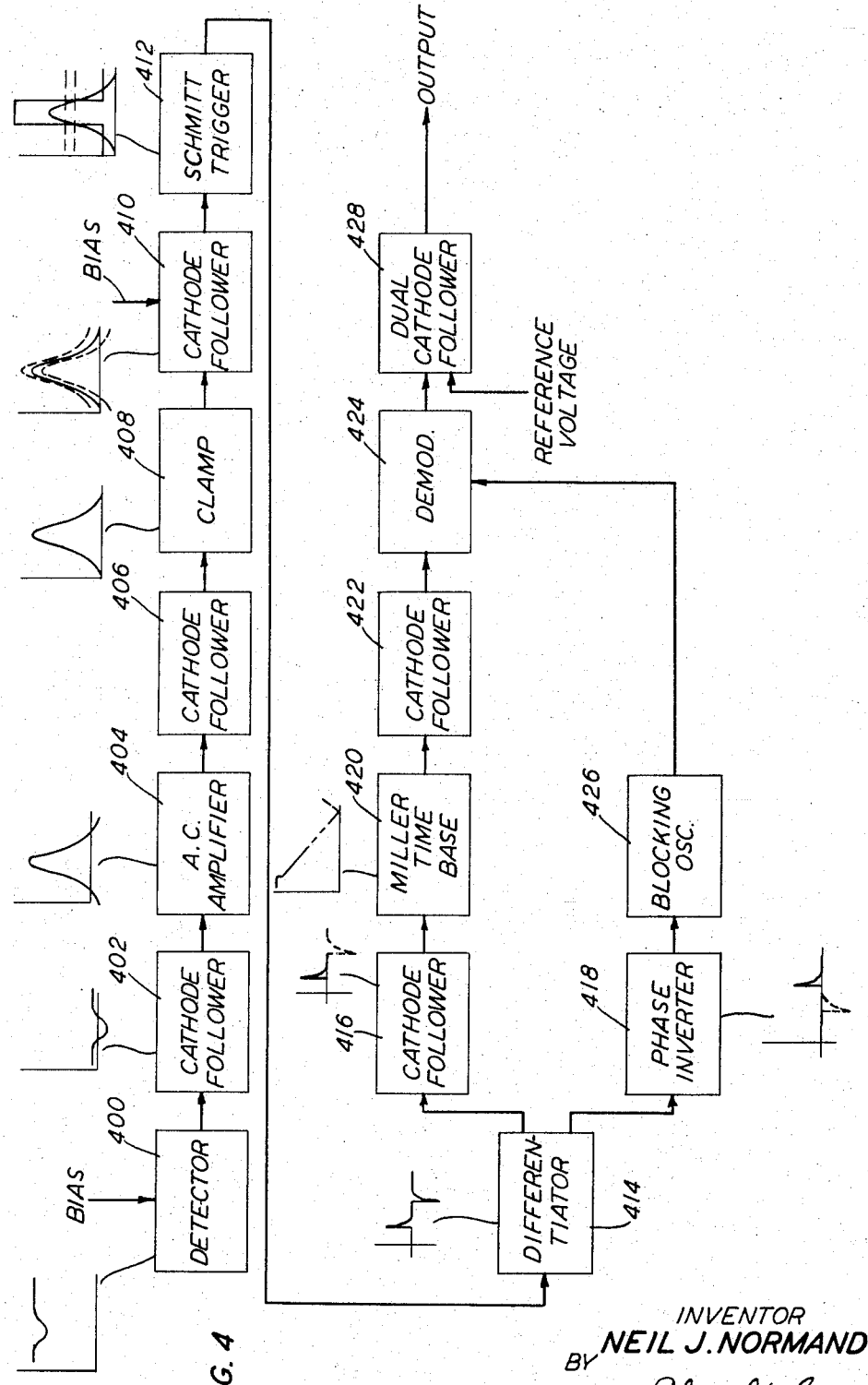

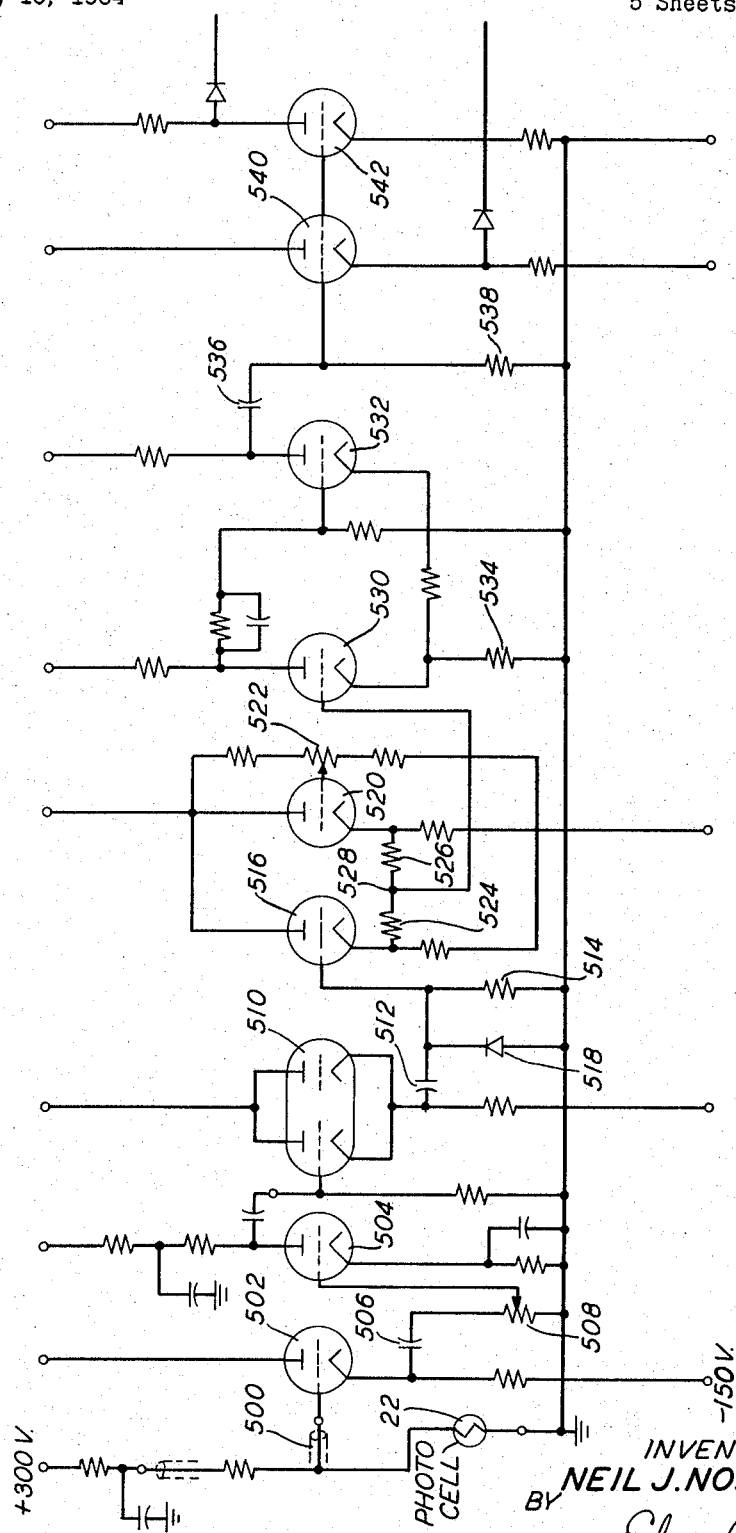

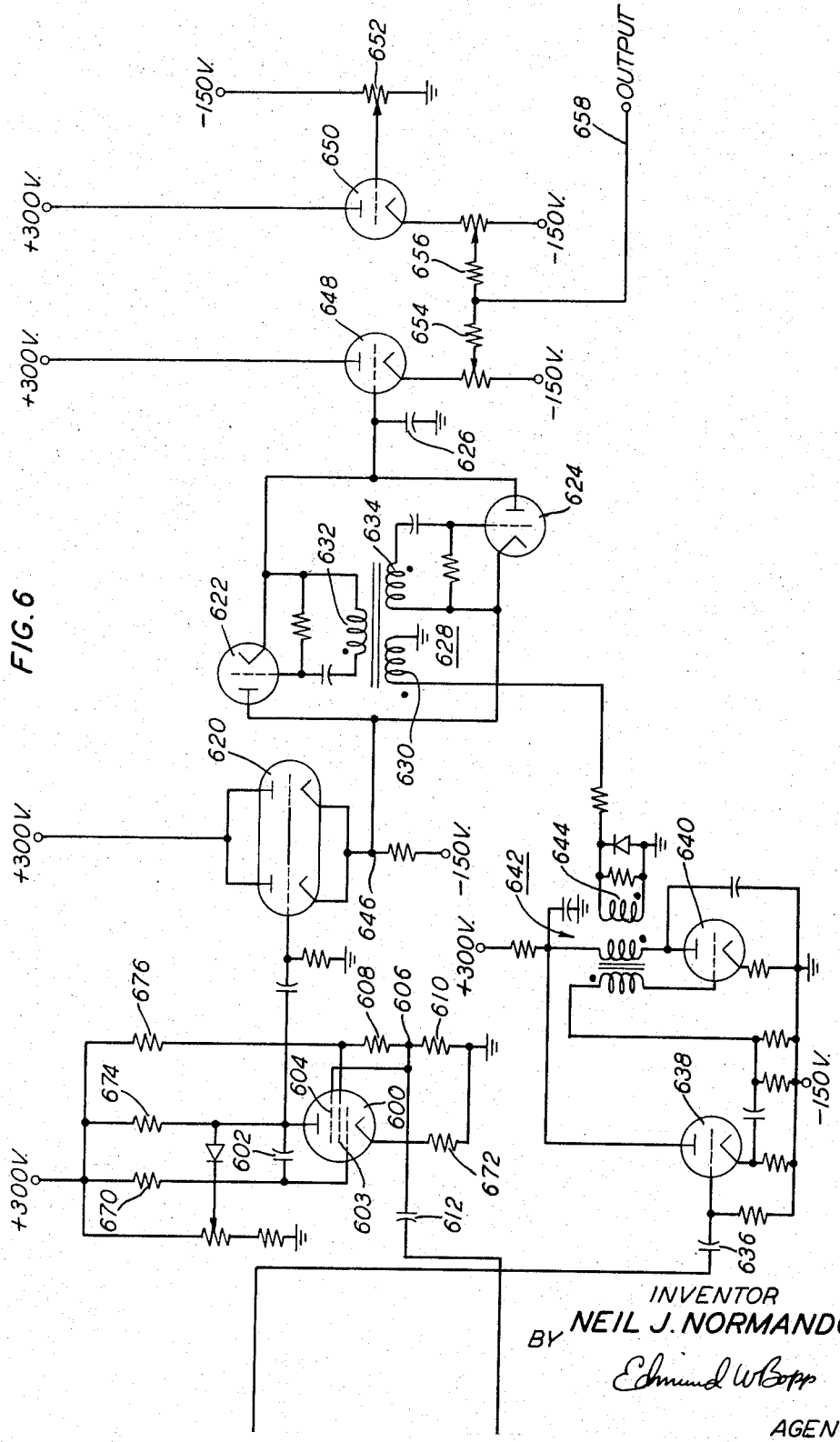

United States Patent Office 3,370,151
Patented Feb. 20, 1968

3,370,151
CONTROL SYSTEM USING RADIANT-ENERGY
DETECTOR SCANNING
Neil J. Normando, Livingston, N.J., assignor to Air Reduction Company, Incorporated, New York, N.Y., a corporation of New York
Filed May 13, 1964, Ser. No. 367,040
9 Claims. (Cl. 219—131)

This invention relates to control systems which employ as a sensing element a radiant-energy detector or photocell, and more particularly to systems in which a radiating surface is periodically scanned to sense a temperature profile upon a line in the radiating surface.

The invention is described and shown herein as employing a radiation-sensitive means which is sensitive mainly to infra-red radiation or mainly to a mixture of infra-red and visible red radiation, but it is to be understood that the invention is not limited to these forms of radiant energy, and is applicable, for example, to other visible radiation or to ultra-violet radiation.

The invention is further described and shown herein as applied to electric arc welding for butt-welding two metal plates together along an extended seam, but it is to be understood that the invention is not limited to the welding art nor to the welding of a seam.

The invention is applicable, for example, to machines or processes in which successive portions of a workpiece are locally heated and satisfactory results are dependent in some way upon maintaining consistently uniform local heating from point to point along a path over the surface of the workpiece.

An object of the invention is to promote uniformity of result in an operation which involves a surface which is radiating energy in a pattern in which the temperature of the surface varies from point to point.

Another object is to repeatedly sense temperature profiles along predetermined paths extending over a surface which is being locally heated.

A specific object is to sense the width of a weld bead by sensing the temperature profile along a line transverse to the longitudinal axis of the bead.

A feature of the invention is that the optical system is arranged to scan periodically in a direction transverse to the direction of relative motion of the energy source and the workpiece, in order to sense a temperature profile of the locally radiating portion of the workpiece that is scanned.

Another feature is that the temperature sensing device is arranged to impress an electrical pulse upon an electrical translating system, which latter is particularly adapted to respond to the scanning of a relatively sharply limited band of the radiating surface scanned wherein the intensity of radiation differs relatively greatly from the intensity of radiation outside the limits of the band.

Another feature is that the electrical translating system is particularly adapted to detect variation in the width of a band of the radiating surface scanned where the thermal conditions within and without the band are materially dierent, even though the transition between these conditions is gradual.

A further feature is an electrical means for translating a train of electrical pulses of variable duration into a wave of variable voltage or current value accurately representative of changes in the duration time of the successive pulses in said train.

In accordance with the invention, the temperature profile along lines transverse to a weld bead at a point at a fixed distance from the welding electrode are successively scanned by a detector which is sensitive mainly to infra-red radiation or mainly to a mixture of infra-red and visible red radiation in order to generate a train of electrical pulses indicative of the successive temperature profiles. The amplitude of each pulse rises rather sharply from background value as the scan enters one edge of the weld bead where the temperature of the metal surface shows a transition from solid metal to molten or partially solidified weld material, and falls rather sharply to the background value as the scan leaves the other edge of the weld bead. Electrical means are provided for measuring the width of the electric pulse between arbitrarily chosen amplitude values which correspond approximately to the actual boundaries of the weld bead. The output of the electrical means is a direct current control wave which varies in amplitude with time as a function of the actual width of the weld bead, or, for greater precision, the output wave may be a differential direct current wave that follows the variations of the bead width above and below a selected normal width of bead. The control wave may be used for any of various purposes, for example to vary some parameter of the welding machine (e.g., speed of electrode travel along the seam, or welding current) to maintain a substantially constant width of the weld bead in order to achieve uniform welding results by correcting for various uncontrollable variations, such as thickness of workpiece, degree of fit-up of pieces to be joined together, etc.

A characteristic of the completed weld which is of particular interest is the depth of penetration of the weld into the material welded. It is highly desirable in many applications of welding to achieve uniform or controlled depth of penetration over the length of a seam being welded. In many cases, a convenient and reliable criterion of the depth of penetration is found to be the width of the weld bead at the surface of the completed weld.

Other objects, features and advantages will appear from the following more detailed description of illustrative embodiments of the invention, which will now be given in conjunction with the accompanying drawings.

In the drawings,

FIG. 2 is a side elevation, partly broken away, of an optical system shown in FIG. 1;

FIG. 3 is an isothermal diagram of a portion of the surface of a workpiece being welded, together with a graph of a typical temperature profile along a designated line on the surface;

FIG. 4 is a block schematic diagram of an electrical system for translating the response of a sensing element into a voltage wave which indicates variations in the width of successive pulses in' the response of the sensing element;

Figure 1:
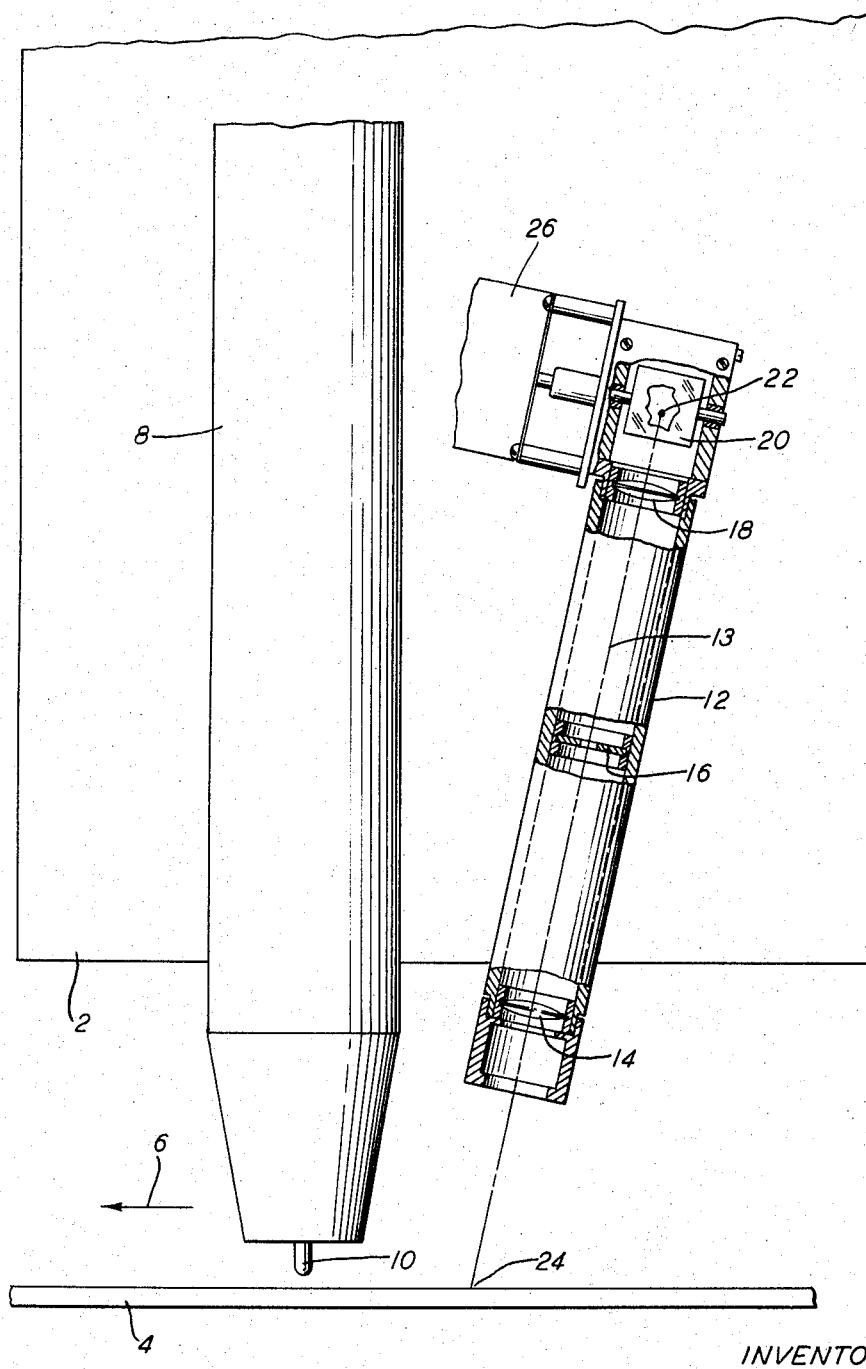
FIG. 1 is a front elevation, partly in vertical section, of a welding head in operative position over a workpiece to be welded.

FIGS. 5 and 6 when placed end to end constitute a more detailed schematic diagram of the electrical features of the circuits shown in block diagram form in FIG. 4.

FIGS. 1 and 2 show a portion 2 of the framework of a welding head arranged to be moved horizontally along a workpiece 4 in the direction of the arrow 6. Attached to the member 2 is a barrel 8 of a welding tool, at the lower end of which protrudes a welding electrode 10 in operative relationship with the workpiece 4 for welding a seam therein. Also attached to the member 2 is an optical tube 12, containing in axial alignment a double convex lens 14, a diaphragm 16 having a horizontal slit aperture therein, another double convex lens 18, and a two-sided mirror 20 rotatable upon a horizontal axis. A detector 22, such as a lead sulfide photocell, or similar device which is sensitive mainly to infra-red radiation or mainly to infra-red and visible red radiation, is mounted near the mirror 20 in position to be irradiated by rays from the mirror as the mirror rotates. The optical axis 13 of the tube 12 falls upon the upper surface of the workpiece 4 at a point 24 directly behind the electrode 10 and suitably spaced therefrom as further explained below. A motor 26 is provided for rotating the mirror 20.

An optical system suitable for use in practicing the invention comprises lenses of one inch diameter and two inch focal length. The lens 14 is mounted at approximately four inches from the point 24 on the workpiece. The diaphragm 16 is placed approximately four inches from each of the lenses 14 and 18, and the median path length from the lens 18 via the mirror 20 to the cell 22 is approximately two inches. A suitable speed of rotation for the mirror 20 is 20 revolutions per second.

In the operation of the arrangement shown in FIGS. 1 and 2, as the electrode 10 is moved along the workpiece 4 in welding a seam, the lens 14 gathers radiation from the hot portion of the molten material of the seam behind the electrode, over a portion centered at the moving point 24. The lens 14 forms a real image upon the diaphragm 16, of which image a narrow linear portion is exposed to the view of the lens 18 through the horizontal slit in the diaphragm. This linear portion of the image consists of the radiation from a narrow band on the surface of the workpiece in a line transverse to the direction of the seam and to the line of travel of the electrode 10. The lens 18 projects rays to the rotating mirror to form a moving real image which falls upon the cell 22 in such manner that the cell 22 scans the linear image repeatedly as the mirror 20 rotates. The cell 22 is provided with a mask 23 (FIG. 2) to expose only a small spot to the radiation so that at any given instant the cell receives radiation from substantially a single point on the workpiece on the line thereon transverse to the direction of the seam. A suitable size of photocell for some applications of the invention is one having a sensitive area of about 0.040 by 0.040 inch, covered by a mask comprising a thin metal sheet through which a circular aperture has been drilled with a No. 80 (0.0135 inch) drill.

FIG. 3 shows an isothermal diagram typical of conditions to be found upon the surface of a workpiece in which a weld is being made by means of electrode 10 moving over the surface of the workpiece in the direction of the arrow 6. The approximate limits of the weld bead are shown by broken lines 300 and 302. Isothermal lines are shown for surface temperatures of 1000° F., 800°, 600°, etc. The temperature gradient ahead of the electrode 10 is steeper than the temperature gradient behind the electrode, as indicated by the shape of the isothermal loops. It will be understood that the whole thermal pattern moves along the seam in substantially fixed spatial relationship to the moving electrode 10. The line of scan of the optical system is transverse to the direction of the arrow 6, and is shown at 304, with the trace of the optical axis of the tube 12 appearing at the point 24. The spacing between the electrode 10 and the point 24 is preferably so chosen that the line 304 is close enough to the electrode 10 to encounter relatively high temperatures between the limits 300 and 302, and far enough back from the electrode 10 so that the temperature gradient along the line is not too steep for good resolution. Typical suitable spacing may range from one-quarter inch to an inch or more, depending upon the temperature of the arc.

FIG. 4 shows in schematic block diagram form illustrative circuitry for translating voltage changes in a photocell during scanning into a control voltage wave suitable for activating the usual types of automatic control apparatus. In the figure, the photocell is represented as a biased detector 400. Typical waveforms at various points in the translating system are shown graphically adjacent to the respective blocks representing the successive circuit elements. The output wave from the detector 400 is substantially unidirectional with the form of an alternating current wave superimposed upon a relatively large direct current component supplied by the bias. This wave is impressed upon a cathode follower 402 which transforms the wave into essentially an alternating current wave free from the direct current component to make the resultant wave adaptable to alternating current amplification, which process is effected in an alternating current amplifier 404. To reconvert the amplified wave to unidirectional form, the output of the amplifier 404 is passed through a cathode follower 406 and thence through a clamp circuit 408, which latter insures that the resultant wave invariably starts upward from and returns to substantially ground potential in response to each pulse from the photocell, thereby establishing a definite reproducible base line for the waves. With this base line once established, the wave form may be raised or lowered by introduction of a selected amplitude of direct current component obtained in a biased cathode follower 410.

The adjusted wave from the cathode follower 410 is applied to a Schmitt trigger circuit 412, which is a device known in the art as having the property that it produces a substantially flat-topped output wave over the duration of a period of time in which the input voltage of the device exceeds a specific critical voltage. By this means a peaked waveform at the input is translated into a flat-topped output pulse the duration of which is the same as the time interval during which the input wave exceeds the selected critical voltage. The cathode follower 410 serves as a means to adjust the vertical position of the input wave of the Schmitt trigger to activate and deactivate the trigger at predetermined points on the sloping sides of the peaked input wave.

A differentiating circuit 414 serves to translate the flat-topped pulse from the Schmitt trigger into a pair of oppositely poled short pulses, one at the start of the flat-topped pulse and another at the end of that pulse. For convenience in the circuitry, the pulses from the differentiator 14 are repeated in a cathode follower 416 and also repeated in inverted phase in a phase inverter 418.

The initial pulse from the cathode follower 416, is impressed upon a Miller time base circuit 420, thereby starting a decreasing output voltage which runs down as a substantially linear function of time in known manner. To actuate the Miller circuit, the initial pulse should be a positive one. The negative final pulse has no effect upon the Miller circuit, the voltage run-down continuing to run its course. The output wave from the Miller circuit 420 is repeated by a cathode follower 422 and applied to the input of a demodulator 424.

The inverted pulses from the phase inverter 418 are impressed upon the input of a blocking oscillator 426. The initial pulse, being negative, has no material effect upon the blocking oscillator, but the final pulse, being positive, serves to generate a pulse in the blocking oscillator, which pulse is impressed upon the demodulator 424.

The demodulator 424 provides a storage capacitor upon which is kept in effect a running record of the time duration of successive flat-topped pulses from the Schmitt trigger 412. The demodulator 424 further provides two oppositely poled unidirectional current paths from its input to the voltage recording capacitor. Both of these paths are normally blocked, but both are activated during the receipt of a pulse from the blocking oscillator 426. During this latter pulse, if the input voltage to the demodulator from the cathode follower 422 is greater than the voltage upon the storage capacitor at the time of receipt of the pulse from the blocking oscillator 426, current flows through one path in the demodulator 424, raising the voltage on the capacitor until it is substantially equal to the input voltage from the cathode follower 422. If on the other hand, the input voltage to the demodulator is less than the voltage upon the storage capacitor, current flows from the storage capacitor through the other path in the demodulator 424, lowering the voltage on the capacitor until it is substantially equal to the input voltage from the cathode follower 422.

The voltage on the storage capacitor is at all times repeated in a cathode follower 428 to give a varying voltage output reflecting changes in the voltage output directly. Dual cathode followers may be provided in place of a single cathode follower at 428, one of which cathode followers may be preset to a constant reference voltage, in which case the difference of the voltages produced by the two cathode followers of the pair 428 may be used as the final output wave to improve the sensitivity of the device to changes in the voltage on the storage capacitor and hence to improve the sensitivity of the device as a whole to changes in the width of the pulse generated in the photocell.

FIGS. 5 and 6 together show illustrative vacuum tube circuits for accomplishing the results described with reference to the block diagram of FIG. 4.

Plate current supply for the various vacuum tubes as well as the various required biasing voltages may be obtained from a suitable direct current source supplying a potential difference from for example plus 300 volts to minus 150 volts with respect to ground potential as shown in the figures.

The biased detector 400 of FIG. 4 comprises the lead sulfide photocell 22 connected between plus 300 volts and ground. A connection, preferably by way of a coaxial cable 500 connects the positive terminal of the photocell 22 to the grid of a triode 502 which is comprised in the cathode follower 402. The cathode of the triode 502 is connected to the grid of a triode 504 which is comprised in the amplifier 404, by way of an alternating current circuit branch comprising a coupling capacitor 506 in series with a potentiometer 508 connected between the cathode and ground. The amplified output of the triode 504 is obtained at the plate electrode thereof and is impressed through an alternating current coupling circuit branch onto the grid electrodes of a cathode follower which may comprise parallel connected halves of a dual triode 510 and which serves as the cathode follower 406 of FIG. 4.

The cathodes of the dual triode 510 are coupled by an alternating current coupling branch circuit comprising a capacitor 512 and a resistor 514 to the grid electrode of a triode 516. The resistor 514 is paralleled by a clamping diode 518, which parallel combination of elements is connected to the grid of triode 516 at one end and to ground at the other. The diode 518 is so poled as to conduct substantially only away from ground, thereby permitting the grid of triode 516 to become more positive than ground but substantially preventing the grid from becoming more negative than ground, in the usual manner of functioning of a clamp circuit, and serving as the clamp 408 shown in FIG. 4.

The bias adjustable cathode follower 410 of FIG. 4 comprises the triode 516 and a similar triode 520 in FIG. 5. The grid electrode of the triode 520 is biased to an adjustable potential by means of a potentiometer 522. The cathodes of the triodes 516 and 520 are coupled through two equal valued resistors 524 and 526 having a common junction 528. When the grids of the triodes 516 and 520 are at the same potential, the junction 528 has a normal potential value, which may be altered according to what potential is impressed upon the grid of triode 516. When the grid of triode 516 is more positive than the grid of triode 520, the cathode potential of the triode 516 rises above that of the cathode of triode 520, thereby raising also the potential of the junction 528. Conversely, when the grid of triode 516 is more negative than the grid of triode 520, the cathode potential of the triode 516 falls below that of the cathode of triode 520, thereby lowering also the potential of the junction 528.

The adjustable biasing feature of the cathode follower 410 employing the potentiometer 522 is of particular importance to the best functioning of the electrical translating system shown in FIGS. 5 and 6. The setting of the potentiometer 522 determines the precise points upon the rising and falling portions of the pulse generated by the photocell at which the Schmitt trigger 412 is activated, and therefore determines the time interval between the initial and final pulses impressed upon the differentiator 414 which is taken to represent the width of the pulse generated by the photocell. It would be appreciated that the width of the pulse generated by the photocell is actually indefinite, depending upon where on the sloping sides of the pulse the width is measured. The clamp 408 together with the bias selected in the potentiometer 522 insures that the width of successive pulses is measured always at the same voltage difference from ground, meaning that the width of the pulse is always measured at comparable points in the successive pulses. A biasing adjustment on potentiometer 522 may be selected so as to give the best correlation between the pulse length determined by the output wave from the cathode follower 428 and the measured width of a weld bead or other physical measurement which is to be made in any given application of the invention.

The result of the biasing adjustment by means of the potentiometer 522 is illustrated graphically in FIG. 3, wherein the horizontal lines 312, 314 and 316 represent the effect of three different settings of the potentiometer 522. Each of the three lines determined a slightly different width of pulse. In terms of correlation between the measured pulse width and the width of the weld bead shown between the lines 300 and 302, the line 314 corresponds most closely to the width of the bead. The line 312 determines a width slightly greater than the actual bead width and the line 316 determines a width slightly less than the actual bead width.

The junction 528 is connected directly to the grid electrode of a triode 530 which constitutes, together with a similar triode 532, the Schmitt trigger shown at 412 in FIG. 4. The plate of the triode 530 is coupled to the grid of the triode 532 and the cathodes of the two triodes are coupled together by way of a common resistor 534. The combination of the two triodes 530 and 532 has two stable operating conditions, one in which the triode 530 is abundantly conductive and the triode 532 is blocked by cathode bias in the resistor 534 maintained by current through the triode 532. In the other stable condition, the triode 532 is abundantly conductive and the triode 530 is blocked by cathode bias in the resistor 534 maintained by current through the triode 532. The trigger may be changed from the one condition to the other by changing the grid potential on the triode 530. A certain critical minimum change in the grid potential of the triode 530 will start a rapid changeover from the one stable condition to the other. The normal potential from the cathode follower junction 528 is so selected as to hold the triode 530 in blocked condition at a selected amount below the critical changeover potential of the Schmitt trigger. If the junction 528 is then increased in potential, the triode 530 suddenly becomes highly conductive as the critical value of grid potential is reached, causing the triode 532 to block suddenly. As the grid potential of the triode 530 continues to rise and then begins to fall, the triode 532 remains blocked until the grid potential of the triode 530 falls through or near the critical potential again, at which time, a reverse changeover occurs. The output of the Schmitt trigger is taken from the plate of the triode 532, which remains at a relatively high potential whenever the grid of the triode 530 is above the critical potential.

The differentiating circuit 414 shown in FIG. 4 is constituted by the series combination of a capacitor 536 and a resistor 538 connected between the plate of the triode 532 and ground, the common junction of this capacitor and resistor being connected directly to the grid electrodes of a pair of triodes 540 and 542. The triode 540 functions as a cathode follower, producing a positive pulse in response to a positive pulse upon its grid, and a negative pulse in response to a negative pulse upon its grid. The triode 542, in response to the same pulse impressed upon triode 540, is arranged as a phase inverter for the pulses, having its output taken from its plate. The triode 542 thus responds to a positive grid pulse by generating a negative plate pulse and to a negative grid pulse by generating a positive plate pulse.

The Miller time base circuit 420 shown in FIG. 4 is represented in FIG. 6 by a pentode 600 and circuits connected thereto. The circuit is essentially an integrating circuit in which the pentode gradually blocks itself over a predetermined brief interval of time commensurate with the time duration of the flat-topped pulses generated by the Schmitt trigger 412. The Miller circuit as shown in FIG. 6 embodies feedback between plate and control grid as provided by a capacitor 602 directly connecting plate and grid.

Initially, the pentode 600 draws screen-grid current essentially to the exclusion of plate current, for the reason that the screen-grid current produces a voltage drop in a cathode resistor 672 which renders the cathode at a higher voltage than the suppressor electrode 604, the latter being connected to a point 606 on a voltage divider comprising resistors 610, 608 and 676. Thus, the suppressor electrode 604 turns back electrons which pass through the screen grid 603, preventing these electrons from reaching the plate. When a sufficient positive pulse is impressed upon the suppressor electrode 604 by way of a capacitor 612, electrons are drawn toward the plate by the suppressor electrode, thereby transferring some of the electron current from the screen-grid to the plate. The supply source then feeds current through a grid circuit resistor 670, the grid-plate capacitor 602, the plate-cathode path of the pentode 600 and the cathode resistor 672, gradually charging the capacitor 602 and thereby gradually lowering the plate voltage of the pentode. By proper choice of circuit elements, in known manner, the lowering of the plate voltage may be made to be a substantially linear function of time. Eventually, the plate voltage is run down to such a low value that the pentode ceases to be conductive. The capacitor 602 then discharges through the resistors 670 and 674 in series, restoring the plate voltage gradually to its original high value, thereby resetting the capacitor 602 for another similar operation.

The screen grid 603 and the suppressor electrode 604 are coupled together by way of the resistor 610 with the result that after the suppressor electrode has been raised initially to a sufficiently positive voltage to start the voltage run-down action, the coupling maintains the suppressor electrode voltage at the required operating value until the run-down is completed, at which time the suppressor electrode again becomes negative with respect to the cathode, thereby completing the resetting of the circuit for the next operation.

The alternating current output of the Miller circuit is impressed upon a cathode follower which may comprise the two parallelly connected halves of a dual triode 620.

The demodulator 424 shown in FIG. 4 is represented in FIG. 6 by a pair of similar triodes 622 and 624. The cathode terminal 646 of the cathode follower tube 620 is connected to the plate electrode of the triode 622 and to the cathode of the triode 624. The cathode of the triode 622 and the plate electrode of the triode 624 are connected to one terminal of the storage capacitor which appears as capacitor 626 in FIG. 6. Both of the triodes 622 and 624 are normally substantially nonconductive, the grid and cathode of each being kept at appropriate relative potentials by capacitor discharge current through a resistor. Both triodes are arranged to be made momentarily conductive by pulses transmitted through a transformer 628 having a primary winding 630 and two secondary windings 632, connected in the grid-cathode circuit of triodes 622 and 634, connected in the grid-cathode circuit of triode 624.

The plate electrode of the phase inverting triode 542 in FIG. 5 is connected through a coupling capacitor 636 to the input of a blocking oscillator which comprises triodes 638 and 640. The output of the blocking oscillator is taken from the plate circuit of the triode 640 through a grid-plate coupling transformer 642, a third winding 644 of which is directly connected to the primary winding 630 of the transformer 628 in the demodulator. When the blocking oscillator is energized it generates a transient pulse which is made to be of the correct polarity to impress positive pulses simultaneously upon the grids of the triodes 622 and 624 in the demodulator. During these pulses, the triodes 622 and 624 are conductive. If the cathode terminal 646 of the cathode follower tube 620 is more positive than the ungrounded terminal of the capacitor 626, current flows from the terminal 646 through triode 622 to the capacitor 626, raising the potential of the capacitor 626 to equal the potential of the cathode terminal 646. If on the other hand, the terminal 646 is less positive than the ungrounded terminal of the capacitor 626, current flows from the capacitor 626 through the triode 624 to the terminal 646, lowering the potential of the capacitor 626 to equal the potential of terminal 646. These current flows occur only during the duration of a pulse generated by the blocking oscillator 426.

The potential at the ungrounded terminal of the capacitor 626 is impressed directly upon the grid of a triode 648 serving as a cathode follower from which an output wave may be taken for use as a control wave. Preferably a second cathode follower is provided to which an adjustable fixed biasing voltage may be applied. For this purpose, a triode 650 is shown with its grid electrode connected to a potentiometer 652. The cathodes of the triodes 648 and 650 are connected by resistors 654 and 656 of substantially equal resistance value with a connection 658 to their common junction. The output wave at the junction 658 is responsive to the difference between the potential derived from the capacitor 626 and the reference voltage selected by means of the potentiometer 652.

In accordance with common practice with reference to circuits of the type shown in FIGS. 5 and 6, dual triodes may be used in many instances, the two halves of such a dual triode serving independently of each other in different positions in the circuit. For example, the triodes 502 and 504 may be the two halves of a dual triode. Other triodes which may be similarly paired off are 516 and 520; 530 and 532; 540 and 542; 622 and 624; 638 and 640; and 648 and 650.

A precise correlation between the width measurement and the final control wave is dependent upon accurate and reproducible functioning of the electronic circuits, especially the cathode follower comprising triodes 516 and 520, and the Schmitt trigger comprising triodes 530 and 532. For best results, the filament voltage for these four triodes particularly should be closely controlled. Means for such filament voltage control are well known in the electronic art.

It will be evident that the scanning means and methods described and shown herein may be used for scanning the underside of a workpiece to sense a temperature profile thereon. Where reflections from the upper surface of the workpiece are an interfering factor, or where the thickness of the workpiece varies, scanning of the underside may be desirable. In such cases, the radiation-sensitive means is made to move with the arc electrode or other heating means along a path preferably parallel with the path of the heating means and to scan along a line transverse to the path of the radiation-sensitive means.

While illustrative forms of apparatus and methods in accordance with the invention have been described and shown herein, it will be understood the numerous changes may be made without departing from the general principles and scope of the invention.

I claim:

1. In a control system, in combination, heating means relatively movable with reference to a workpiece to locally heat successive portions of the workpiece along a path over a surface of the workpiece, radiation-sensitive means movable with said heating means over a path on a surface of the workpiece, the path of said heating means and the path of said radiation-sensitive means being substantially parallel to each other, and means to cause said radiation-sensitive means to scan along a line transverse to the path of said radiation-sensitive means, to sense a radiation profile along said transverse line.

2. In a control system, in combination, heating means relatively movable with reference to a workpiece to locally heat successive portions of the workpiece, along a path over the surface of the workpiece, radiation-sensitive means movable with said heating means over said path, and means to cause said radiation-sensitive means to scan along a line transverse to said path to sense a radiation profile along said transverse line.

3. In a welding machine, in combination, means to produce a weld bead along a path on the surface of a workpiece, said means comprising a welding head movable relatively to the workpiece along said path, radiation-sensitive means movable as a unit with said welding head along a path substantially parallel to the first mentioned path, said radiation-sensitive means being focused upon a portion of the surface of the workpiece that is heated by heat from said weld bead to sense radiation from said surface portion, and means causing said radiation-sensitive means to scan along a line transverse to the path of said radiation-sensitive means.

4. In a welding machine, in combination, means to produce a weld bead along a linear path on the surface of a workpiece, said means comprising a welding head movable relatively to the workpiece along said path, radiation-sensitive means mounted behind said welding head and movable as a unit therewith, said radiation-sensitive means being focused upon said weld bead to sense radiation therefrom, and means causing said radiation-sensitive means to scan along a line transverse to said linear path to sense a temperature profile along said transverse line.

5. Apparatus according to claim 4, in which said means to cause scanning is repetitive to cause said radiation-sensitive means to scan repeatedly along successive lines transverse to said linear path.

6. In a welding machine, in combination, means to produce a weld bead along a linear path on the surface of a workpiece, radiation-sensitive variable electric impedance means arranged to sense a temperature profile along a line transverse to said linear path immediately after the formation of said weld bead, electric circuitry connected to said radiation-sensitive means for generating an electrical pulse having a pulse shape substantially proportional to said temperature profile, electric means responsive to a critical value of amplitude in said pulse to generate a pair of relatively short electrical impulses, of which the first is generated when said first mentioned pulse first exceeds said critical value of amplitude and the second of which is generated when said first mentioned pulse next falls below said critical value of amplitude, and electrical means for measuring the time interval between said first and second relatively short electrical impulses, whereby the time interval so measured is a measure of the width of said weld bead along said line transverse to said linear path as evidenced by a rise and fall of the amount of radiation from the workpiece at the respective edges of the weld bead.

7. In a welding machine, in combination, means to produce a weld bead along a linear path on the surface of a workpiece, radiation-sensitive variable electric impedance means arranged to sense a temperature profile during solidification of said weld bead by scanning said surface along a line transverse to said linear path, electrical means responsive to a critical value of amplitude in said pulse to generate a pair of relatively short electrical impulses separated in time by an interval which is a measure of the width of said weld bead along said line transverse to said linear path as evidenced by a rise in temperature upon scanning one edge of said weld bead and by a fall in temperature upon scanning the other edge of said weld bead, means to establish a source of variable voltage capable of changing from a standard initial value at a substantially linear rate as a function of time, voltage storage means, means actuated by the first of said relatively short electrical impulses to start the changing of said source of voltage from said standard initial value, and means actuated by the second of said relatively short electrical impulses to bring the voltage existing upon said voltage storage means to substantial equality with the said changing voltage at the time of occurrence of said second relatively short impulse, whereby said voltage storage means stores a voltage determined by the said measure of the width of the weld bead.

8. In a welding machine, in combination, means to produce a weld bead along a linear path on the surface of a workpiece, radiation-sensitive variable electric impedance means arranged to follow said weld bead producing means at a fixed distance therefrom and arranged to sense successive temperature profiles of said weld bead by repeatedly scanning said surface along lines transverse to said linear path thereby generating a train of electrical pulses, electrical means responsive to a critical value of amplitude in any said pulse to produce from each said pulse a pair of relatively short electrical impulses separated in each pair by a time interval which is a measure of the width of said bead at the place of scanning as evidenced by a rise in temperature upon scanning one edge of said bead and by a fall in temperature upon scanning the other edge of said weld bead, electrical means to translate each said pair of relatively short impulses into a representative voltage, voltage storage means, means actuated by the second of said relatively short electrical impulses in each said pair to bring the voltage of said voltage storage means to substantial equality with said representative voltage for said pair of impulses, whereby said voltage storage means provides a continuing measure of the width of the weld bead.

9. In a welding machine, in combination, means to produce a weld bead along a linear path on the surface of a workpiece, radiation-sensitive variable electric impedance means arranged to follow said weld bead producing means at a fixed distance therefrom and arranged to sense successive temperature profiles of said weld bead by repeatedly scanning said surface along lines transverse to said linear path, thereby generating a train of electrical pulses, electrical clamping means for relating each said pulse consistently to ground potential as a base, biased cathode follower means for adjustably raising or lowering the said relationship of the pulses to the ground potential base, a trigger circuit for translating each said pulse into a substantially flat-topped pulse, differentiating means for translating each said flat-topped pulse into a pair of oppositely poled relatively short impulses, one occurring at the start of and the other at the end of said flat-topped pulse, an integrating circuit arranged to start integrating upon the occurrence of the said first relatively short impulse, a voltage storage means, means actuated upon the occurrence of the second of said relatively short impulses to bring the voltage upon said voltage storage means into agreement with the voltage of said voltage integrating means, and cathode follower means to follow variations in the voltage upon said voltage storage means caused by variations in the width of said weld bead as measured by successive scans by said radiation-sensitive means.

References Cited

UNITED STATES PATENTS

| 2,089,014 | 8/1937 | Bucknam et al. | 219—135 X |
| 3,101,618 | 8/1963 | Hance | 73—355 X |
| 3,240,913 | 3/1966 | Schubert | 219—60 |

RICHARD M. WOOD, *Primary Examiner.*

J. G. SMITH, *Assistant Examiner.*